United States Patent

Fremont et al.

[11] 4,080,174
[45] Mar. 21, 1978

[54] EMISSION CONTROL SYSTEM

[75] Inventors: Henry A. Fremont; Edward F. Hedrick, both of Hamilton, Ohio

[73] Assignee: Champion International Corporation, Stamford, Conn.

[21] Appl. No.: 773,428

[22] Filed: Mar. 1, 1977

Related U.S. Application Data

[63] Continuation of Ser. No. 513,452, Oct. 9, 1974, abandoned, which is a continuation-in-part of Ser. No. 433,783, Jan. 16, 1974, abandoned.

[51] Int. Cl.² .......................... B01J 8/04; B01J 35/04; F26B 1/00
[52] U.S. Cl. .................. 23/288 F; 23/277 C; 23/288 FB; 23/288 FC; 23/288 J; 34/72; 34/82
[58] Field of Search ............ 23/277 R, 277 C, 288 F, 23/288 FB, 288 FC, 288 J; 34/72, 79, 80, 82; 55/208, 319, 322; 126/92 B, 39 M; 219/374–376, 381, 382

[56] References Cited

U.S. PATENT DOCUMENTS

| | | | |
|---|---|---|---|
| 2,795,054 | 6/1957 | Bowen | 23/288 FB UX |
| 3,228,755 | 1/1966 | Lohinville | 23/288 FB |
| 3,299,620 | 1/1967 | Hollingworth | 23/288 FB UX |
| 3,314,159 | 4/1967 | Betz | 34/72 |
| 3,467,491 | 9/1969 | Hardison | 23/288 F UX |
| 3,540,429 | 11/1970 | Svensson et al. | 126/92 B |
| 3,731,668 | 5/1973 | Smith | 129/92 B X |
| 3,749,130 | 7/1973 | Howitt et al. | 23/288 FC UX |
| 3,779,710 | 12/1973 | Burstein et al. | 23/288 FC UX |
| 3,780,772 | 12/1972 | Carnahan et al. | 23/288 FC UX |
| 3,785,778 | 1/1974 | Burstein et al. | 23/288 FC |

Primary Examiner—R.E. Serwin
Assistant Examiner—Michael S. Marcus
Attorney, Agent, or Firm—Evelyn M. Sommer

[57] ABSTRACT

An emission control system and a method of treating a gaseous effluent from a veneer dryer prior to venting to the atmosphere. The system comprises means for temperature adjustment, flow control, and catalytic oxidation of the effluent.

5 Claims, 9 Drawing Figures

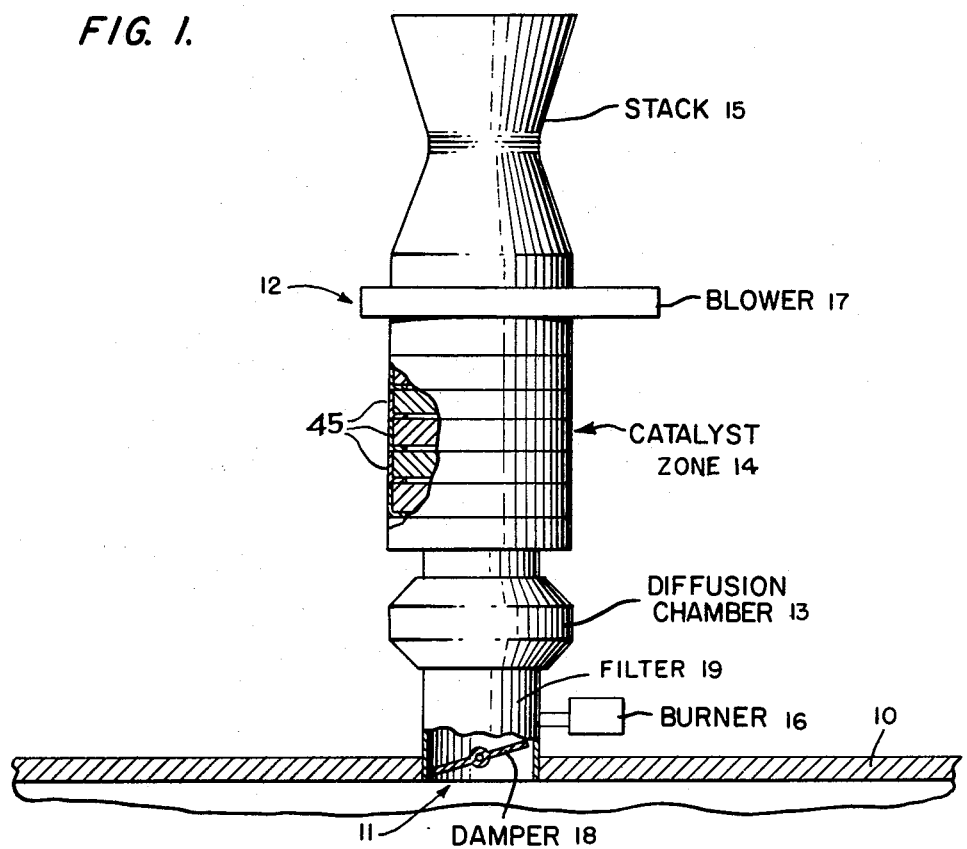
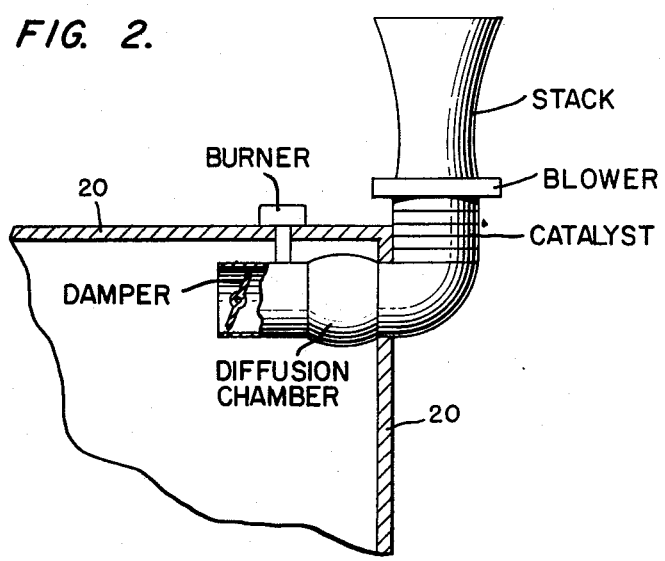

EMISSION CONTROL SYSTEM

This application is a continuation of our application Ser. No. 513,452, filed Oct. 9, 1974, which, in turn, is a continuation-in-part of our application Ser. No. 433,783, filed Jan. 16, 1974 both of which are now abandoned.

BACKGROUND OF THE INVENTION

It is common practice to dry wood fibers, wood veneer, and plywood in ovens utilizing either heated air or steam flow as the drying means.

In typical steam dryer operations, the air flow can vary from about 5,000 to 10,000 SCFM. The drying causes large volumes of water vapor to be expelled from the wood and, together with the water, there are expelled organic materials such as rosin-type materials and terpenes. Such organic materials are not only vented to the atmosphere where they cause a substantial pollution problem but, in addition, the higher boiling fractions thereof, such as abietic acid, condense on the walls and exit of the smokestack or the dryer requiring extended maintenance because such buildup is a potential fire hazard.

Attempts to overcome this problem by the use of higher drying temperatures to degrade the organic materials or keep them from condensing have not been entirely successful due to the fact that such higher temperatures cause an undesirable darkening of the wood or wood fibers. In addition, apparatus and methods for handling the large amount of effluent gas from such dryers are not satisfactory in that they soon foul and themselves require extensive and repeated maintenance.

SUMMARY OF THE INVENTION

An improved system and method have now been developed which are capable of substantially reducing the pollutant content i.e. cleaning, large volumes of effluent gas from wood dryers and without either extensive fouling or rosin buildup.

Briefly stated, the present invention comprises an emisson control system for treating the gaseous effluent from a drying apparatus prior to venting said gaseous effluent from said apparatus to the atmosphere. The system comprises, in combination and in fluid-flow communication, an inlet, a diffusion chamber for adjusting the flow of the gaseous effluent so that it assumes a substantially uniform flow across the area of its path of travel as it exits said chamber, and a catalyst zone containing a catalyst capable of catalytically oxidizing organic materials in said gaseous effluent. The system of the present invention also comprises the means for and method of treating the gaseous effluent from the dryer to regulate its temperature as hereinafter described. The temperature regulated effluent thereafter is adjusted in flow pattern to be substantially uniform across the area of its confined path of travel to the catalyst zone in which there is catalytically oxidized substantially of all the organic materials contained therein. The system, further, may include a high temperature non-combustion reaction source, preferably a radiation source, adjacent to at least one face of a catalyst section in the direction of flow of the effluent.

BRIEF DESCRIPTION OF THE DRAWINGS

FIG. 1 is an elevational view of one form of the invention, portions thereof having been broken away to illustrate a damper and catalyst bed;

FIG. 2 is an elevational view of an alternate form of the invention;

DETAILED DESCRIPTION

Figure 3:
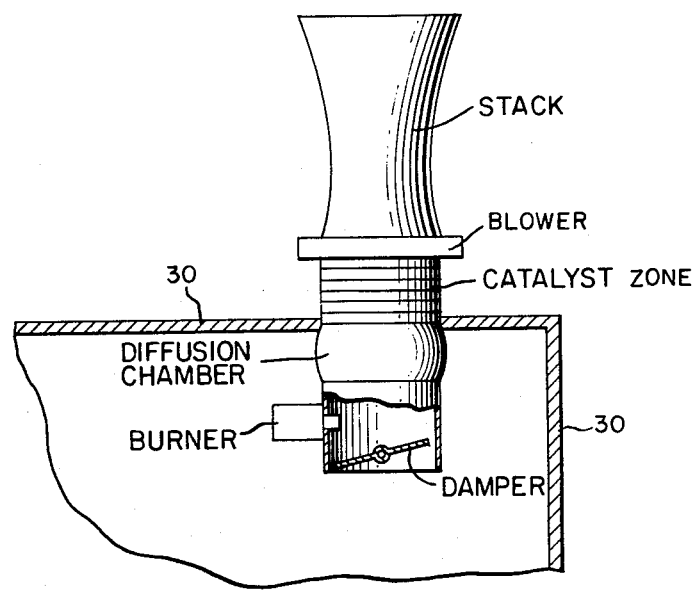
FIG. 3 is an elevational view of a further form of the invention.

While the instant invention is suitable for use with any of the presently used drying ovens and procedures, it has particular application to and will be described in connection with wood veneer drying.

Referring to all of the drawing figures, there are shown in fragmentary form, the insulated roofs and/or walls 10, 20, 30 . . . and 70 of a drying oven adapted for drying wood veneer. The oven can be any of those conventionally used to dry such product. The structure and operation of such dryers is well known in the art and, since the dryer itself forms no part of the present invention other than in the combination with the system as the source of the emission to be controlled, will not be described in detail.

Wood, having a water content of from about 40 to about 60 percent by weight, is dried utilizing steam or gas-fired drying means to heat air which is then forced through the dryer to dry the wood. As limited a quantity of air as possible is used in order to minimize the amount of air that has to be heated as well as to limit the amount of gas that is expelled through the stack leaving the dryer. Typically, the air flow will be, as previously noted, in the range of about 5,000 to about 10,000 SCFM. The air in leaving the dryer will contain about 20 percent by volume vapor comprising essentially water, rosin fatty acids, and terpenes that are extracted from the wood. Based on wood containing from about 40 to about 60 percent by weight water and subject to treatment with the noted air flow, there will be exhausted from the dryer anywhere from about 5–15 pounds per hour of organic materials.

The temperature of a veneer dryer effluent gas can vary widely, but typically is about 300° to 375° F.

In present dryer practice, as has been noted, such water and organic materials are simply vented through the stack with the consequent problems noted of air pollution and dryers and stack fouling and accompanying fire hazard.

In accordance with the present invention, the emission control system 12 of a first embodiment is disposed to receive the emission from the dryer at an outlet 11 (see FIG. 1). The system 12 generally comprises a diffusion chamber 13, catalyst treatment zone 14, and stack 15. The diffusion chamber 13, catalyst treatment zone 14, and stack 15 are in fluid flow communication so that exhaust or effluent gas from the dryer will pass therethrough in the sequence noted.

It may be desired to incorporate combustor means 16, preferably a burner, for heating the effluent gas prior to its entry into diffusion chamber 13. A blower 17 is located between catalyst zone 14 and stack 15 to maintain flow conditions during operation. For optimum operation, it is also desirable to have gas flow control means such as a damper 18 placed at the outlet of the dryer or inlet to the emission control system 12, the inlet/outlet, as indicated, being denoted by the numeral 11.

Means for separating entrained particular matter, as for example, a filter 19 (the form of which is not shown although described below) may be incorporated within to span the conduit within the region of the inlet for the exhaust of effluent gas from the dryer thereby to isolate the downstream components of the system including the burner 16 from entrained particulate matter of gross size. Thus, in drying certain wood materials, such as fibers, veneer or flakeboard, large gross particles may, on occasion, be entrained in the drying air stream and otherwise carried into the system 12 where they collect on the catalyst in catalyst zone 14 and impair the efficiency thereof. A preferred example of such separating means is a filter preferably formed of any one of the commercially available porous ceramic types. With such filters, application of heat and/or flame can be used to burn off any wood particles trapped thereon as discussed below. This form of filter is suitable for use in each of the embodiments hereof. However, there may be used to equal advantage different types of particle entrapment means such as a metal screen.

The function of burner 16 in the present invention is to adjust the temperature of the effluent gas stream to that temperature at which the organic compounds therein will be most effectively catalytically oxidized in the subsequent catalyst zone 14. As has been previously noted, most of the difficulty with fouling comes from the condensable high boiling rosin material such as abietic acid. By raising the heat of the effluent gas stream, such materials will be brought to a temperature at which they will remain in gaseous form. Further, by raising the heat of the effluent gas stream to such temperature it is best converted by the catalyst which then operates more effectively to oxidize the organic material to harmless byproducts which then can be safely vented to the atmosphere. The temperature range most suitable for the platinum catalyst hereinafter described is about 450° to 525° F. The burner 16 can also be used to consume the wood particles entering the system past damper 18 or that are trapped on the filter. Such burning of particles trapped on the filter eliminates the need to shut down the system to clean the filter.

Diffusion chamber 13 preferably is utilized to adjust the flow of effluent gas so that it assumes a substantially uniform flow across the area of its path of travel. This insures that the effluent gas will be evenly spread across the catalyst zone.

Catalyst zone 14, preferably comprises a series of catalyst containing means, or beds 45. In the FIG. 1 embodiment each of the beds are in close proximity one to the other. The catalyst is preferably a commercially available platinum metal sol coated on a carrier of expanded aluminum oxide or aluminum silicate. Such a carrier is sold under the trade name "Torvex". It will be evident that other known catalysts and/or carriers can be used in gas permeable means which will function to oxidize the organic materials in the effluent gas to harmless and non-polluting byproducts. The size of each catalyst zone, the depth thereof, number of beds, and the like are dependent upon the degree of pollutants in the effluent stream as well as the volume of air handled in the particular dryer. This can be readily calculated, and for a dryer having an air flow of 10,000 SCFM with wood fibers having the characteristics noted previously, the catalyst zone itself will be approximately 4 feet by 4 feet in cross-section and containing a number of beds.

It is also preferred to have a blower 17 above the catalyst to insure that all gaseous effluent in the dryer passes through the system 12 of the present invention and is treated prior to being passed through stack 15.

In the figures, while the stacks illustrated have been shown as Venturi types the instant invention is effective with any stack configuration. The purpose of the preferred Venturi type stack is to minimize the stack steam plume. Since the heated off-gas can contain some 20 percent moisture, a plume could result, under certain atmospheric conditions, if Venturi flaring or some similar control device were not utilized to vent the cleaned gas to the atmosphere.

Figure 4:
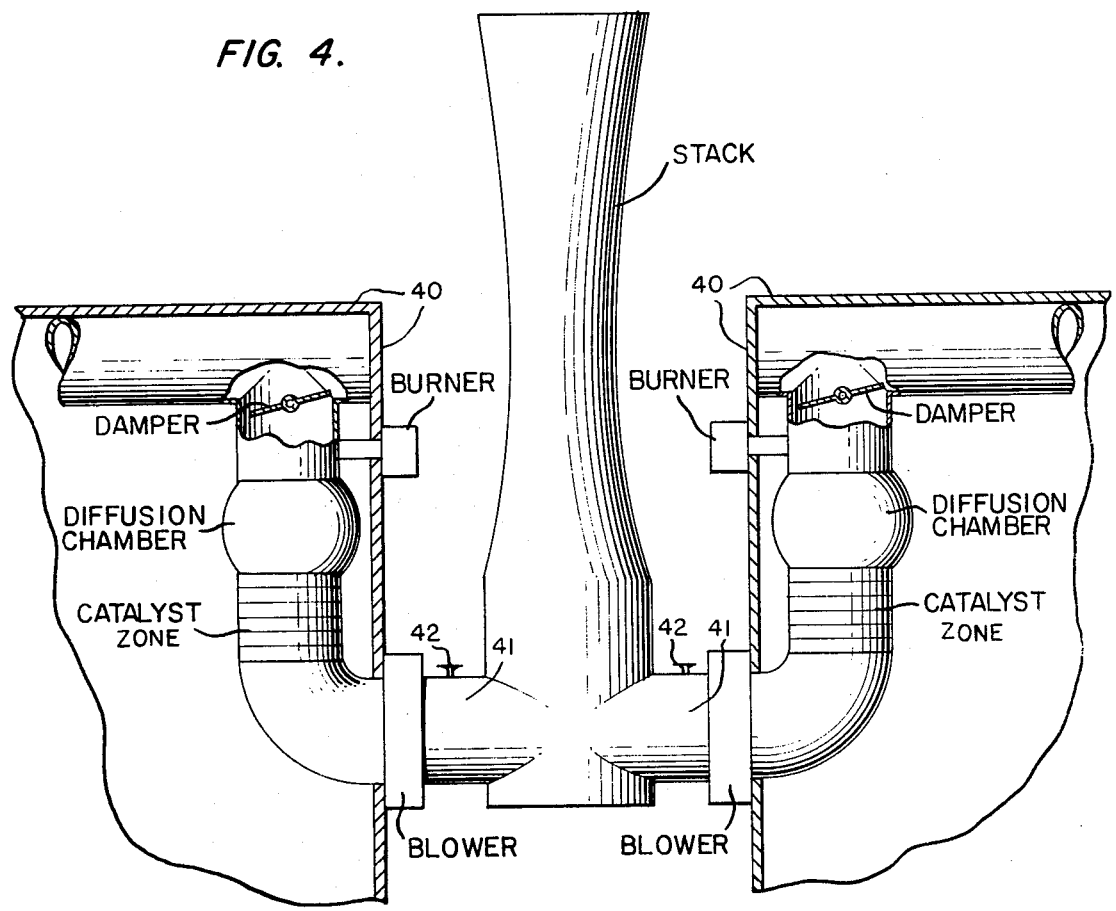
FIG. 4 is an elevational view of a form of the invention wherein a single stack accommodates at least a pair of dryers.
Figure 5:
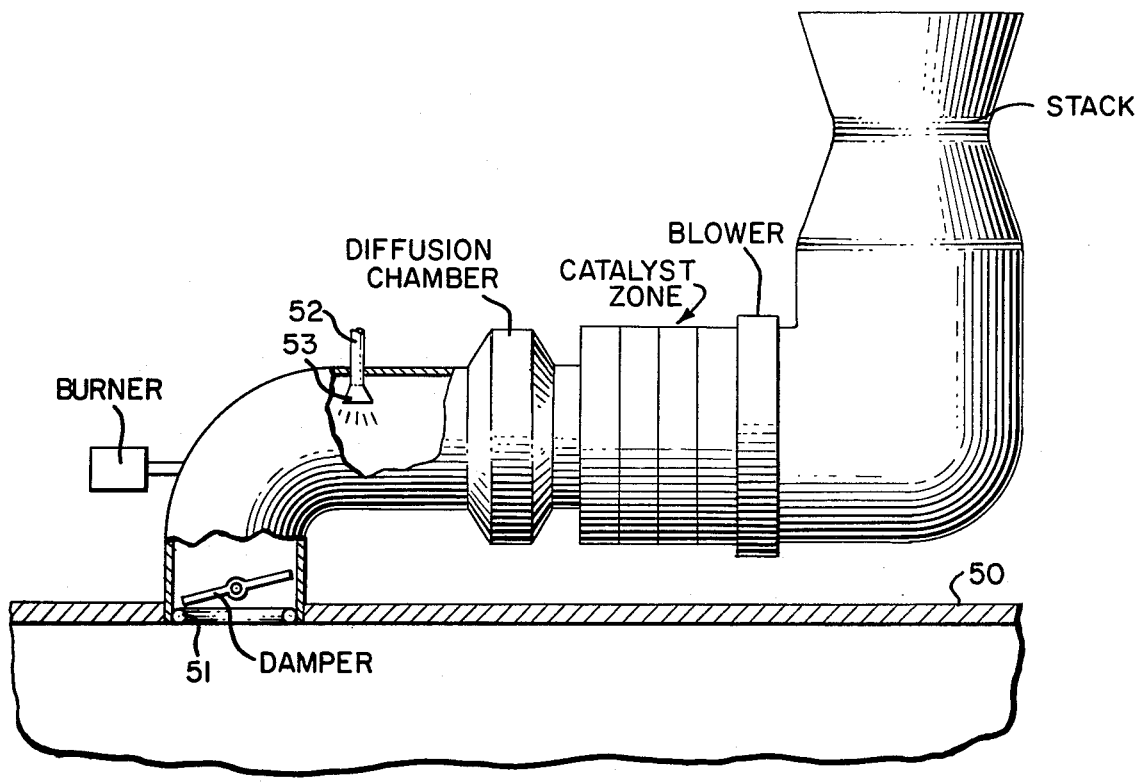
FIG. 5 is an elevational view of yet a further form of the invention including heating means and activating gas inlet means upstream of the effluent inlet.

While the foregoing description has been mainly of the invention as illustrated in FIG. 1, it is equally applicable to the embodiments depicted in FIGS. 2–5 and for the most part to the preferred embodiment of FIGS. 6–9. It will be evident that the FIGS. 2–5 embodiments utilize the same components in the assembly as described in connection with FIG. 1, but illustrate various alternatives in associating the assembly with a wood dryer. Thus, FIG. 2 depicts a side mounting with the damper and diffusion chamber in the dryer; FIG. 3 illustrates a top mounting with the burner, damper, and diffusion chamber in the dryer; FIG. 4 illustrates a single stack for venting effluent gas from two dryers; and FIG. 5 illustrates a mounting on the roof of the dryer with the burner, damper, and diffusion chamber being outside of the dryer.

In the embodiment shown in FIG. 4, the stack is preferably separated from each of the blowers by a short conduit 41, each containing a flow control valve 42. Should only one dryer be in use, the valve in the conduit 41 of the other dryer can be closed to permit the assembly of the operating dryer to work most effectively.

The embodiment depicted in FIG. 5 includes a heating element 51 and an inlet conduit and nozzle 52, 53, respectively, for passing activating gas to the system. The heating element 51 preferably is in the form of a coil mounted on the inside wall at the inlet to the system. The source of heat may be by exchange of heat from circulating fluids such as steam, hot water, and the like. Alternatively, the heating element can be an electric coil. The heating element 51 functions to raise the temperature of the effluent gas at the inlet to prevent deposition of pollutants from the gas stream. The heating element may operate in conjunction with the burner 16.

The activating gas from a source (not shown), while as illustrated is introduced to the system through inlet conduit 52 and nozzle 53, may be introduced into the assembly by any means as is suitable. The conduit for supply of gas from the source, such as a tank, may include the conventional valve structure for control purposes. The inlet is positioned upstream of the diffusion chamber so that any gas introduced likewise will be substantially uniformly spread across the path of flow of the effluent gas into the catalyst zone. As used herein, the term "activating gas" refers to gases such as hydrogen, carbon monoxide, ammonia and ozone which act to increase the speed of oxidation. The hydrogen, for example, in amounts as low as 1 percent, can be periodically injected into the effluent gas. The hydrogen will react with the preferred platinum catalyst raising the temperature of the catalyst surface to a temperature of about 75° to 100° F. above that of the effluent gas, which temperature differential gives an increased catalyst reactivity. With a similar quantity of gas such as ozone, there is more rapid oxidation in the effluent gas stream which results in increased catalyst reactivity. Thus, the activating gases can act directly on the catalyst or the effluent gas.

Figure 6:
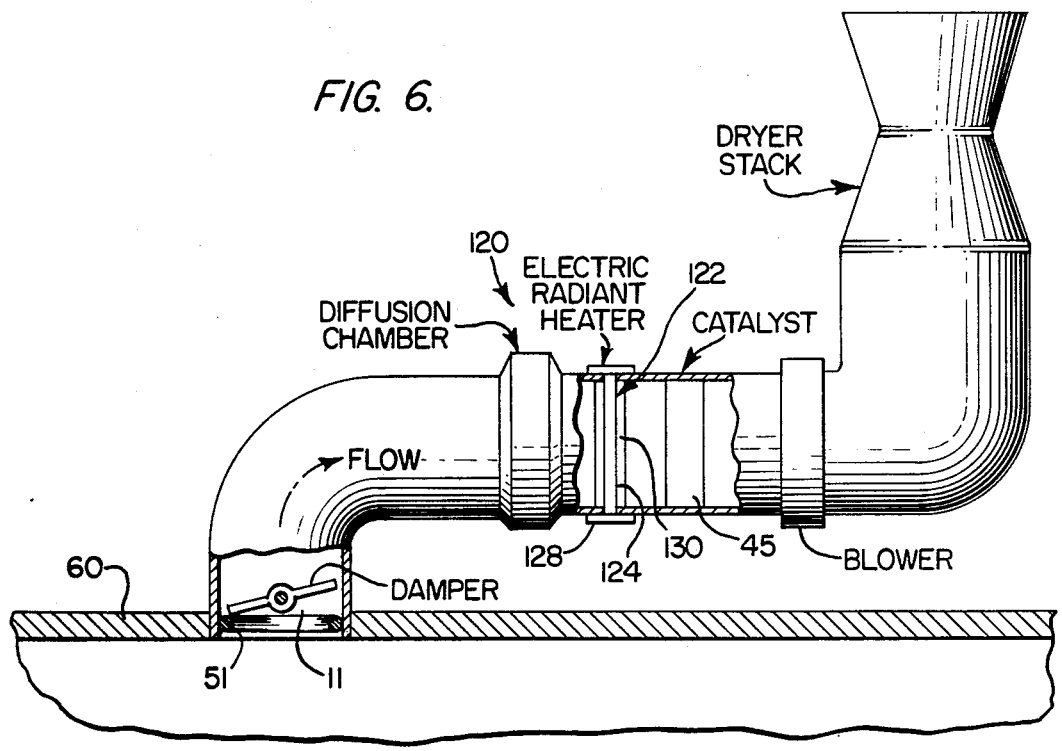
FIG. 6 is an elevational view, partly in section, of a preferred form of the invention.

Turning our attention now to what are considered the preferred embodiments of the invention, i.e., FIGS. 6-9, there is illustrated a system 120 for controlling the emission from a dryer. The emission control system 120 of FIG. 6 is enclosed within an elbow shaped conduit mounted on the roof 60 of the dryer, and includes structure whose construction and operation, unless specified otherwise, duplicates that of the previously described embodiments. Effluent from the dryer passes into the system at the outlet 11 of the dryer under control of a damper. Preferably, the dryer effluent will be heated to or maintained at dryer temperature by a heating element 51 disposed at the outlet 11.

A diffusion chamber is disposed to receive the flow of effluent and to pass the effluent to the catalyst under substantially laminar flow conditions across the conduit. For the sake of simplicity only a single of what may be multiple of beds 45 of catalyst is illustrated in FIG. 6.

Heating means 122 is disposed in the direction of effluent flow just before the catalyst arranged in stack 121. The heating means preferably is formed by a multiplicity of electric heating elements which extend in an array across the conduit in spaced parallel relation (see FIG. 9). Each heating element is formed by a metal sleeve or sheath 124 which surrounds a resistance member. Suitable refractory material 126, such as magnesium oxide, is compacted around the resistance member by conventional procedures to provide a stabilizing medium for purpose of insulation. At least the sheath or the so-called "cold pin" attached to both ends of the resistance member extends through opposite sides of the conduit. Each of the heating elements is connected in parallel in an electric circuit. A cover 128 received on the conduit encloses the area of connection. It will be readily evident that other heating means can be utilized so long as they are capable of adjusting the temperture of the catalyst to that desired.

The heating elements provide direct radiant heat transfer to the upstream face of the bed 45 of catalyst. The catalyst described above is considered capable of absorbing some 90 to 95 percent of the radiant heat energy. To this end, the heating elements are disposed within rather close proximity to the face. It has been found that this spacing may range from about 2 to about 8 inches from the face. Preferably, the spacing of the heating elements will be about 2 to 4 inches.

A plurality of reflecting members 130 for reducing convection losses are positioned within the conduit on the upstream side of the heating elements. Each member may be of semi-circular, parabolic, or of other similar structures for directing the radiation toward the face of the catalyst. Suitably, the members will be formed of material to provide a reflective surface.

As may now have been appreciated the embodiments of FIGS. 6-9 operate without resort to the combustor 16 of, for example, the FIG. 1 embodiment. To this end, it has been found that the radiation from the heating elements also heats the stream moving toward the catalyst by convection.

The radiant energy transferred to the catalyst face, to heat the face to a temperature of from about 100° to about 150° F. above ambient effluent temperature may be provided in the preferred embodiment by a grid of heating elements located on about 3 inch centers across a generally square conduit for a flow of 5,000 SCFM. The conduit may be about 28 inches in both dimensions. The total power input may be approximately 60 kw.

The catalytic activity has been found to increase significantly through use of the heating elements as described. The enhancement is in a substantial doubling of the reaction rate for each 20° F. rise in catalyst temperature over its normal temperature, as long as the reaction is not mass transfer limited.

Figure 8:
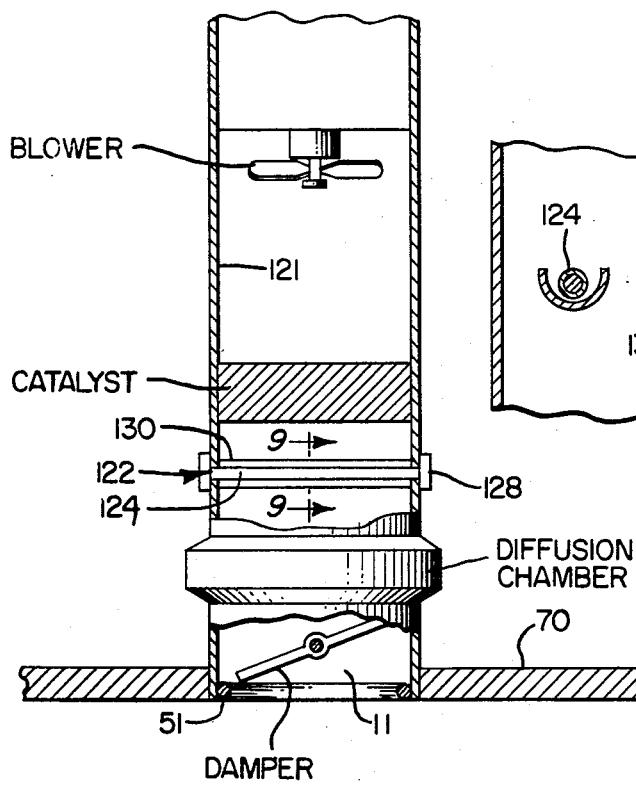
FIG. 8 is an elevational view of the form of FIG. 6 in axial alignment.
Figure 9:
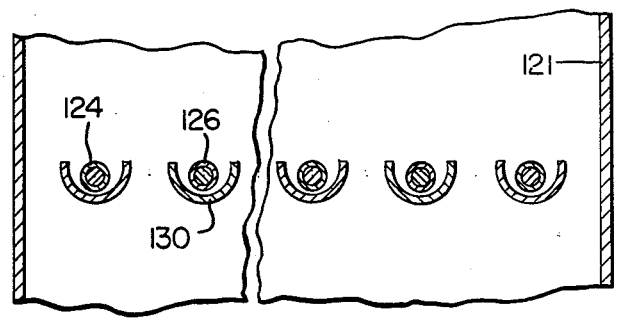
FIG. 9 is a section as seen along the line 9—9 in FIG. 8.

The embodiment of FIG. 8 illustrating a straight-through conduit otherwise duplicates that of FIG. 6 in structure and operation.

Figure 7:
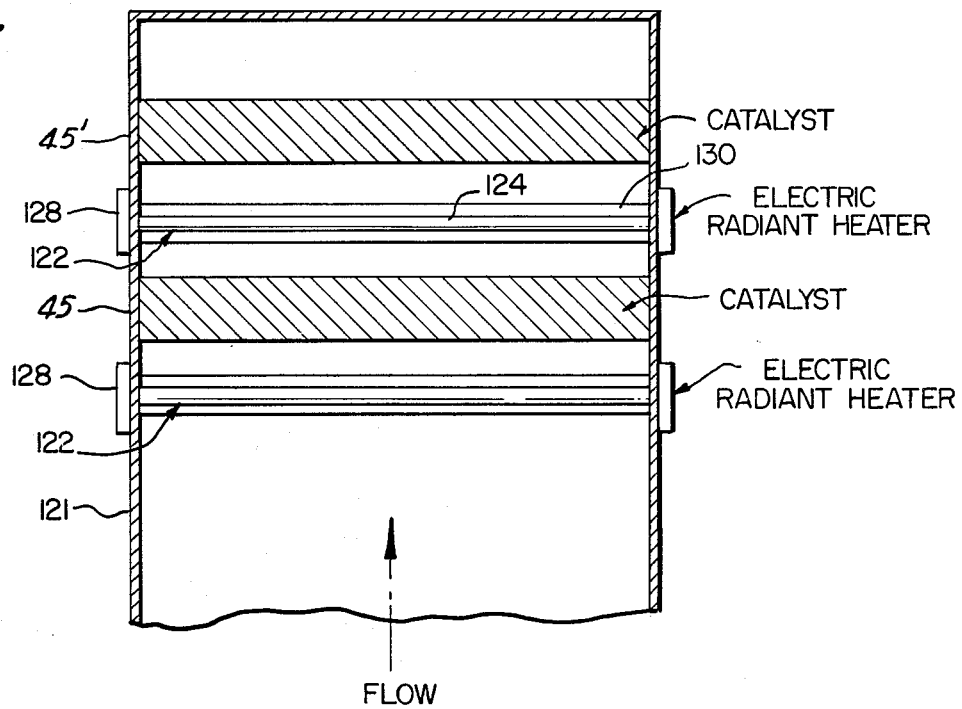
FIG. 7 is an elevational view, partly in section, of a pair of catalyst beds having a heating source adjacent to the leading face of each bed.

FIG. 7 illustrates an alternative make-up of the catalyst whereby a second bed 45' of catalyst is spaced from a first bed 45 of catalyst, both of which are utilized for purposes of oxidation of the dryer effluent. A grid of heating elements 122 is disposed adjacent to each bed in a manner and for the purposes as previously described.

A blower, as illustrated in FIG. 8, it utilized with each of the embodiments of FIGS. 6-9 to pull the gases through the stack 121.

In a specific example of the process, 0.1 inch Douglas Fir heart strips were dried in a veneer oven at the rate of 7,794 square feet, 1 hour ($\frac{3}{8}$ inch basis).

The temperature of the dryer exhaust effluent gas was 354° F. and the temperature at the catalyst face was 513° F.

At the inlet to the catalytic unit, the effluent particulate concentration was 0.272 grains/scf. the emission rate was 7.04 pounds per hour, the flow rate was 3021 DSCMF, and the moisture content was 14.6 percent by volume.

The cleaned effluent exhausted from the catalytic unit had a particulate concentration of 0.053 grains/scf, an emission rate of 1.73 pounds per hour, a flow rate of 3816 DSCFM, 13.5 percent moisture by volume, and zero stack flow opacity.

While the process of the instant invention is largely evident from the above description, it comprises passing the effluent gas into a diffusion chamber to obtain as best as possible substantially uniform flow across the area of its confined path of travel and then passing the gas into a catalyst zone. In its preferred embodiment, the effluent gas is heated to a temperature above that at which the organic materials contained therein will condense and the surface of the catalyst is heated by a closely disposed source of radiant heat. In this manner and by these means substantially all of the organic materials contained in the flow are catalytically oxidized to innocuous byproducts.

While the present invention has been described in connection with a preferred embodiment, it is not intended to limit the invention to the particular form set forth, but, on the contrary, it is intended to cover such alternatives, modifications and equivalents as may be included within the spirit and scope of the invention as defined by the appended claims.

What is claimed is:

1. An emission control system for cleaning substantially the entire flow of gaseous effluent from an apparatus for drying wood-type products prior to venting said gaseous effluent from said drying apparatus to the atmosphere, said system comprising, in in-line combination and in fluid flow communication, an inlet, first means for heating said gaseous effluent to a temperature preventing condensation of organic materials entrained in said effluent, a diffusion chamber for adjusting the flow of said heated gaseous effluent so that it assumes substantially a uniform flow across the area of its path of travel, a catalyst zone including at least two spaced apart catalyst beds both operating at temperatures sufficient to oxidize the organic materials present in said gaseous effluent, second heating means including an array of heating elements disposed in the upstream path of said flow and adjacent to a face of each catalyst in said catalyst beds, reflective means disposed in the region of said heating elements of said array for directing radiant energy to said face of each catalyst for heating said catalyst and said gaseous effluent thereby to maintain said gaseous effluent in an elevated noncombusted gaseous state through said catalyst zone, means connecting said heating means in an electric circuit, and a stack having an output emitting said gaseous effluent in a cleaned condition to the atmosphere.

2. The system of claim 1, including means for maintaining the flow of said gaseous effluent to said catalyst zone.

3. The system of claim 1, wherein said reflective means are supported to partially surround each of said heating elements for directing radiant energy to said face of said catalyst bed.

4. The system of claim 1, including means for introducing an activating gas into said flow of gaseous effluent, said introducing means communicating said activating gas between said inlet and said diffusion chamber.

5. The system of claim 1, including filter means interposed between the inlet and the diffusion chamber for filtering solid particles from said gaseous effluent.

* * * * *

UNITED STATES PATENT OFFICE
CERTIFICATE OF CORRECTION

Patent No. 4,080,174　　　　　　　　Dated March 21, 1978

Inventor(s) Henry A. Fremont et al.

It is certified that error appears in the above-identified patent and that said Letters Patent are hereby corrected as shown below:

In the Abstract, line 2, insert after "effluent" the words -- is disclosed. The system is particularly suited for treating gaseous effluents --.

Column 5, line 5, insert the word -- thereby -- before the word "raising".

Signed and Sealed this

Twenty-fourth Day of October 1978

[SEAL]

Attest:

RUTH C. MASON
Attesting Officer

DONALD W. BANNER
Commissioner of Patents and Trademarks